United States Patent
Finkenaur, III

(10) Patent No.: US 10,577,475 B1
(45) Date of Patent: Mar. 3, 2020

(54) EPOXY WITH PHOTOLUMINESCENT PIGMENT

(71) Applicant: RGF Materials Company, Phoenixville, PA (US)

(72) Inventor: Robert G Finkenaur, III, Phoenixville, PA (US)

(73) Assignee: RGF Materials Company, Phoenixville, PA (US)

( * ) Notice: Subject to any disclaimer, the term of this patent is extended or adjusted under 35 U.S.C. 154(b) by 344 days.

(21) Appl. No.: 15/782,929

(22) Filed: Oct. 13, 2017

Related U.S. Application Data

(60) Provisional application No. 62/408,843, filed on Oct. 17, 2016.

(51) Int. Cl.
| | |
|---|---|
| *C08K 3/22* | (2006.01) |
| *C08L 63/00* | (2006.01) |
| *C08L 79/02* | (2006.01) |
| *C08L 81/04* | (2006.01) |
| *C08K 3/36* | (2006.01) |
| *C08K 5/17* | (2006.01) |
| *C08K 5/37* | (2006.01) |
| *C08K 5/109* | (2006.01) |
| *C09K 11/02* | (2006.01) |
| *C09D 5/22* | (2006.01) |
| *C09D 163/00* | (2006.01) |

(52) U.S. Cl.
CPC ............ *C08K 3/22* (2013.01); *C08K 3/36* (2013.01); *C08K 5/109* (2013.01); *C08K 5/17* (2013.01); *C08K 5/37* (2013.01); *C08L 63/00* (2013.01); *C08L 79/02* (2013.01); *C08L 81/04* (2013.01); *C09D 5/22* (2013.01); *C09K 11/02* (2013.01); *C08K 2003/2227* (2013.01); *C09D 163/00* (2013.01)

(58) Field of Classification Search
CPC .. C08L 63/00; C09D 5/22; C09D 7/40; C09D 7/61; C09D 163/00; C09K 11/02
See application file for complete search history.

(56) References Cited

U.S. PATENT DOCUMENTS

| | | | | |
|---|---|---|---|---|
| 4,522,861 | A * | 6/1985 | Dunsworth | ........... E04F 11/166 428/192 |
| 5,874,491 | A * | 2/1999 | Anders | ................... C09D 5/004 252/301.36 |
| 5,997,627 | A | 12/1999 | Baebler | |
| 6,005,024 | A * | 12/1999 | Anders | ................... C09D 5/004 252/301.36 |
| 7,074,345 | B2 | 7/2006 | Saito et al. | |
| 8,286,378 | B2 | 10/2012 | Martin et al. | |
| 8,801,967 | B2 | 8/2014 | Mack et al. | |
| 8,877,326 | B1 | 11/2014 | Postrozny | |
| 9,215,803 | B2 | 12/2015 | Yanigida et al. | |
| 9,243,151 | B2 | 1/2016 | Schmitz | |
| 2005/0239227 | A1 | 10/2005 | Aanegola et al. | |
| 2010/0240772 | A1 | 9/2010 | Koplin et al. | |
| 2012/0104319 | A1* | 5/2012 | Postma | ..................... C09D 5/22 252/301.36 |
| 2013/0082191 | A1 | 4/2013 | Raghavan et al. | |
| 2014/0319416 | A1* | 10/2014 | Warren | ................ C09K 11/025 252/182.14 |
| 2015/0166883 | A1* | 6/2015 | Krook | ................ C09K 11/7734 252/301.36 |
| 2015/0361270 | A1 | 12/2015 | Tasaki et al. | |

FOREIGN PATENT DOCUMENTS

WO     WO91/12292     8/1991

OTHER PUBLICATIONS

AKEPOX 4050 Anti-Slip Mix Technical Instruction Sheet. 2005. 2 pages.
https://www.ebay.com/itm/Foxtire-Glow-in-the-Dark-Illuminating-Line-Epoxy-Photoluminescent-Fire-Safety/173784376744?hash=item28765b25a8:g:7x4AAOSw0TpcXa7K. 1 page. Original date unknown.

\* cited by examiner

*Primary Examiner* — C Melissa Koslow
(74) *Attorney, Agent, or Firm* — Joseph E. Maenner; Petock & Petock, LLC

(57) ABSTRACT

In described embodiments, a highly visible epoxy compound having photoluminescent and traction properties is provided. The compound includes between about 10% and about 25% by weight photoluminescent material having granular size between about 50 microns and about 250 microns.

20 Claims, No Drawings

EPOXY WITH PHOTOLUMINESCENT PIGMENT

CROSS-REFERENCE TO RELATED APPLICATION

The present application claims priority from U.S. Provisional Patent Application Ser. No. 62/408,843, filed on Oct. 17, 2016, which is incorporated herein by reference in its entirety.

BACKGROUND OF THE INVENTION

Field of the Invention

The present invention relates to an epoxy, and, in particular, to an epoxy having a photoluminescent pigment and a granular type filler embedded therein.

Description of the Related Art

Epoxy is a well-known compound that employs a fluid resin and a fluid hardener that, when mixed together, form a solid compound.

U.S. Patent Application Publication No. 2015/0166883 to Krook discloses a photoluminescent compound that includes a pigment doped epoxy in which the epoxy is present as about 56-58% of the mixture and the pigment is the balance of about 42-44% of the mixture. Such proportions include too much pigment, resulting in poor strength, adhesion, and durability/toughness of the resulting solid compound.

It would be beneficial to provide an epoxy with both photoluminescent and traction properties that is sufficiently tough and adhesive so that the epoxy can be used to form interior and exterior stair treads that glow in the dark, as well as for other purposes.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an epoxy compound comprising a Part A resin having about a 10-20% by weight photoluminescent material; a 5-15% by weight texture material; a 1-3% by weight filler material; and a 62-84% by weight remainder. A Part B hardener has about a 10-20% by weight photoluminescent material; a 5-15% by weight texture material; a 1-5% by weight filler material; and a 60-84% by weight remainder.

DETAILED DESCRIPTION

Certain terminology is used herein for convenience only and is not to be taken as a limitation on the present invention. The terminology includes the words specifically mentioned, derivatives thereof and words of similar import. The term "compound" is intended to mean a mixture of two or more separate components.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a highly visible epoxy compound having photoluminescent and traction properties. The epoxy compound is comprised of a Part A resin and a separate Part B hardener that are mixed together. The mixing generates a chemical reaction that forms a solid epoxy compound. Typically, the Part A resin and the Part B hardener are mixed together in a 50-50 weight or volume ratio, although those skilled in the art will recognize that approximate 50-50 ratios (weight or volume) are often achieved without deleterious effect, such that Part A resin to Part B hardener ratios (weight or volume) of between about 45-55 and about 55-45 are sufficient.

In an exemplary embodiment, the Part A resin and the Part B hardener have viscosities that do not vary more than about 13% from each other. In an exemplary embodiment, the Part A resin has a viscosity of about 208,000 centipoise at room temperature (about 22 degrees Celsius) and the Part B hardener has a viscosity of about 184,000 centipoise at room temperature. Both the Part A resin and the Part B hardener are at least translucent and preferably transparent in order to take advantage of the photoluminescent properties of the compound. This high viscosity also allows for a more precise application of the inventive epoxy on irregular and non-level surfaces.

To provide the photoluminescent properties, in an exemplary embodiment, each of the Part A resin and the Part B hardener are doped with a photoluminescent pigment that, upon exposure to light, absorbs light energy such that, after removal of the light source, the photoluminescent pigment glows for a period of time. In an exemplary embodiment, the photoluminescent pigment is strontium aluminate.

Such glow is beneficial for certain epoxy compounds, such that those that are desired to be seen in darkened areas, such as on stair treads, as well as in other applications, including, but not limited to edges of ramps, stairs, sidewalks, driveways, curbs, drop offs, pedestrian crossings, and stage floors.

While both the Part A resin and the Part B hardener are doped with the photoluminescent pigment, those skilled in the art will recognize that only one of the Part A resin and the Part B hardener can be doped with the photoluminescent pigment in order to provide the desired photoluminescence of the compound.

The particle size of the photoluminescent pigment has a direct effect on the brightness and glow of the compound. The larger the particle size, the brighter the glow and the duration of the glow. However, it was discovered that the larger the particle size, the more difficult it was to keep the pigment in suspension and achieve complete dispersion. It was desired to provide a pigment size that did not require either of the Part A resin or the Part B hardener to be mixed prior to use. It was determined that pigment particle size in the range of between about 50 microns and about 250 microns was a desired range of pigment particle size.

Further, the weight percent of photoluminescent pigment directly affects the brightness of the glow of the compound. The more pigment that is provided in the compound, the brighter the glow. However, too much pigment decreases the adhesion and toughness/durability properties of the Part A resin with the Part B hardener, so a balance had to be determined.

In an exemplary embodiment, it was determined that between about 10% and about 42% by weight photoluminescent pigment is added to each of the Part A resin and the Part B hardener. In another exemplary embodiment, it was determined that between about 10% and about 25% by weight photoluminescent pigment is added to each of the Part A resin and the Part B hardener. In still another exemplary embodiment, it was determined that between about 10% and about 20% by weight photoluminescent pigment is added to each of the Part A resin and the Part B hardener. In an alternative exemplary embodiment, it was determined that between about 10% and about 15% by weight photoluminescent pigment is added to each of the Part A resin and the Part B hardener. In still an alternative exemplary embodiment, it was determined that between about 10% and about 12% by weight photoluminescent pigment is added to each of the Part A resin and the Part B hardener.

A texture material is provided in each of the Part A resin and the Part B hardener. In an exemplary embodiment, the texture material comprises a translucent material to allow at least some light to pass through the texture material and impact the photoluminescent pigment. In an alternative embodiment, the texture material comprises a transparent material to allow significantly more light to pass through the texture material and impact the photoluminescent pigment. In an exemplary embodiment, the texture material can be polyallydiglycol carbonate.

The density of the texture material is between about 1.2 and about 1.4 grams/cm$^3$ so that the texture material remains in suspension in each of the Part A resin and Part B hardener without having to mix either of the Part A resin or the Part B hardener prior to mixing the Part A resin and the Part B hardener together.

In an exemplary embodiment, the texture material has a compression strength of between about 20,000 psi to about 25,000 psi and a tensile strength of between about 4,000 and about 9,000 psi. Further, the texture material has a granular size of between about 600 and about 1,500 microns.

The texture material is a granular material that provides a rough texture to the hardened compound to enhance the traction properties, durability, and abrasion resistance of the compound. In an exemplary embodiment, the texture material is granular, generally colorless hard polymer. The texture material increases the coefficient of friction of the cured compound.

The filler material adds thickness, rheology, and thixotropic properties to the resin and to the hardener to reduce the photoluminescent and texture material from dropping out of the respective mixtures and to keep the photoluminescent and texture material in suspension in the respective mixtures. An exemplary filler material can be synthetic amorphous silica.

Exemplary embodiments of inventive epoxies are provided in the tables below.

Example 1

| Part A resin | | |
|---|---|---|
| Chemical name | CAS No. | Weight % |
| Photoluminescent pigment | 12004-37-4 | 10-25% |
| Texture material | 25656-90-0 | 5-15% |
| Filler material | 7631-86-9 | 1-3% |
| Remainder: | | |
| Bisphenol A-Epichlorohydrin polymer | 25068-38-6 | 57-84% |

| Part B hardener | | |
|---|---|---|
| Chemical name | CAS No. | Weight % |
| Photoluminescent pigment | 12004-37-4 | 10-25% |
| Texture material | 25656-90-0 | 5-15% |
| Filler material | 7631-86-9 | 1-5% |
| Remainder: | | 55-84% |
| Polyamine-Polymercaptan Blend | | 54-79% |
| 2-4-6-tris (dimethylaminomethyl)-phenol | 90-72-2 | 1-5% |

Example 2

| Part A resin | | |
|---|---|---|
| Chemical name | CAS No. | Weight % |
| Photoluminescent pigment | 12004-37-4 | 10-20% |
| Texture material | 25656-90-0 | 5-15% |

-continued

Part A resin

| Chemical name | CAS No. | Weight % |
|---|---|---|
| Filler material | 7631-86-9 | 1-3% |
| Remainder: | | |
| Bisphenol A-Epichlorohydrin polymer | 25068-38-6 | 62-84% |

Part B hardener

| Chemical name | CAS No. | Weight % |
|---|---|---|
| Photoluminescent pigment | 12004-37-4 | 10-20% |
| Texture material | 25656-90-0 | 5-15% |
| Filler material | 7631-86-9 | 1-5% |
| Remainder: | | 60-84% |
| Polyamine-Polymercaptan Blend | | 58-78% |
| 2-4-6-tris (dimethylaminomethyl)-phenol | 90-72-2 | 2-6% |

Example 3

Part A resin

| Chemical name | CAS No. | Weight % |
|---|---|---|
| Photoluminescent pigment | 12004-37-4 | 10-15% |
| Texture material | 25656-90-0 | 5-15% |
| Filler material | 7631-86-9 | 1-3% |
| Remainder: | | |
| Bisphenol A-Epichlorohydrin polymer | 25068-38-6 | 67-84% |

Part B hardener

| Chemical name | CAS No. | Weight % |
|---|---|---|
| Photoluminescent pigment | 12004-37-4 | 10-15% |
| Texture material | 25656-90-0 | 5-15% |
| Filler material | 7631-86-9 | 1-5% |
| Remainder: | | 65-84% |
| Polyamine-Polymercaptan Blend | | 62-77% |
| 2-4-6-tris (dimethylaminomethyl)-phenol | 90-72-2 | 3-7% |

Example 4

Part A resin

| Chemical name | CAS No. | Weight % |
|---|---|---|
| Photoluminescent pigment | 12004-37-4 | 10-12% |
| Texture material | 25656-90-0 | 5-15% |
| Filler material | 7631-86-9 | 1-3% |
| Remainder: | | |
| Bisphenol A-Epichlorohydrin polymer | 25068-38-6 | 70-84% |

Part B hardener

| Chemical name | CAS No. | Weight % |
|---|---|---|
| Photoluminescent pigment | 12004-37-4 | 10-12% |
| Texture material | 25656-90-0 | 5-15% |
| Filler material | 7631-86-9 | 1-5% |
| Remainder: | | 68-84% |
| Polyamine-Polymercaptan Blend | | 64-76% |
| 2-4-6-tris (dimethylaminomethyl)-phenol | 90-72-2 | 4-8% |

The inventive epoxy is ICC IBC 2009 and NYC Buildings 2014 Construction Codes compliant and meets or exceeds the requirements of ASTM E 2072. The initial test was performed with the compound being applied onto a wood surface with a high gloss white coating applied (highest Light Reflectance Value) to achieve the highest possible luminance levels at the lowest concentration of photoluminescent pigment. While a wood surface was used, those skilled in the art will recognize that other types of surfaces, such as concrete, cement, steel, or other suitable surfaces, can be used.

The inventive epoxy can be used in the absence of a pre-coating, meaning that the inventive compound can be applied directly to the surface being used, and does not need any other coating on the surface, resulting in a shorter amount of time required to apply the epoxy, and lower cost to apply the epoxy. In an exemplary embodiment, the inventive epoxy is applied in a thickness of about 0.03 inches. The epoxy can be applied using a 0.03 inch thick masking tape to mask areas around where the epoxy is to be applied.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An epoxy compound comprising:
    a Part A resin comprising:
        about 10-20% by weight photoluminescent material;
        about 5-15% by weight texture material;
        about 1-3% by weight filler material; and
        about 62-84% by weight remainder;
    and
    a Part B hardener comprising:
        about 10-20% by weight photoluminescent material;
        about 5-15% by weight texture material;
        about 1-5% by weight filler material; and
        about 60-84% by weight remainder.

2. The epoxy compound according to claim 1, wherein the Part A resin comprises about 10-15% by weight photoluminescent material and about 67-84% by weight remainder.

3. The epoxy compound according to claim 2, wherein the Part A resin comprises about 10-12% by weight photoluminescent material and about 70-84% by weight remainder.

4. The epoxy compound according to claim 1, wherein the Part B resin comprises about 10-15% by weight photoluminescent material and about 65-84% by weight remainder.

5. The epoxy compound according to claim 4, wherein the Part B resin comprises about 10-12% by weight photoluminescent material and about 68-84% by weight remainder.

6. The epoxy compound according to claim 1, wherein the Part A resin has a viscosity of about 208,000 centipoise at room temperature.

7. The epoxy compound according to claim 1, wherein the Part B resin has a viscosity of about 184,000 centipoise at room temperature.

8. The epoxy compound according to claim 1, wherein the texture material comprises a translucent material.

9. The epoxy compound according to claim 1, wherein the texture material comprises a transparent material.

10. The epoxy compound according to claim 1, wherein the texture material has a compression strength of between about 20,000 and about 25,000 psi.

11. The epoxy compound according to claim 1, wherein the texture material has a tensile strength of between about 4,000 and about 9,000 psi.

12. The epoxy compound according to claim 1, wherein the texture material has a granular size of between about 600 and about 1,500 microns.

13. The epoxy compound according to claim 1, wherein a volume ratio of Part A resin to Part B hardener is between about 45-55 and about 55-45.

14. The epoxy compound according to claim 13, wherein the volume ratio of Part A resin to Part B hardener is about 50-50.

15. The epoxy compound according to claim 1, wherein the photoluminescent material has a particle size between about 50 microns and about 250 microns.

16. The epoxy compound according to claim 1, wherein the viscosity of the Part A resin is within a range of about 13% of the viscosity of the Part B hardener at room temperature.

17. The epoxy compound according to claim 1, wherein the epoxy compound is applied directly to a surface in the absence of a pre-coating.

18. The epoxy compound according to claim 1, wherein the epoxy compound is ICC IBC 2009 and NYC Buildings 2014 Construction Codes compliant.

19. The epoxy compound according to claim 1, wherein the epoxy compound at least meets the requirements of ASTM E 2072.

20. An epoxy compound comprising:
a Part A resin comprising:
about 10-25% by weight photoluminescent material;
about 5-15% by weight texture material;
about 1-3% by weight filler material; and
about 57-84% by weight remainder;
and
a Part B hardener comprising:
about 10-25% by weight photoluminescent material;
about 5-15% by weight texture material;
about 1-5% by weight filler material; and
about 55-84% by weight remainder.

* * * * *